US010373637B2

(12) United States Patent
Lu et al.

(10) Patent No.: US 10,373,637 B2
(45) Date of Patent: Aug. 6, 2019

(54) GRANULARITY IN OVERLYING MAGNETIC AND NON-MAGNETIC LAYERS

(71) Applicant: Seagate Technology LLC, Cupertino, CA (US)

(72) Inventors: Bin Lu, San Ramon, CA (US); Jan-Ulrich Thiele, Sunnyvale, CA (US); Ganping Ju, Pleasanton, CA (US); Xiaoding Ma, Fremont, CA (US); YingGuo Peng, San Ramon, CA (US); YinFeng Ding, Fremont, CA (US)

(73) Assignee: Seagate Technology LLC, Cupertino, CA (US)

( * ) Notice: Subject to any disclaimer, the term of this patent is extended or adjusted under 35 U.S.C. 154(b) by 341 days.

(21) Appl. No.: 15/448,514

(22) Filed: Mar. 2, 2017

(65) Prior Publication Data

US 2018/0254061 A1 Sep. 6, 2018

(51) Int. Cl.
*G11B 5/66* (2006.01)
*G11B 5/65* (2006.01)
*G11B 5/00* (2006.01)
*B32B 15/04* (2006.01)

(52) U.S. Cl.
CPC .................. *G11B 5/66* (2013.01); *G11B 5/65* (2013.01); *B32B 15/04* (2013.01); *G11B 2005/0021* (2013.01)

(58) Field of Classification Search
CPC .......... G11B 5/66; G11B 5/653; G11B 5/732; G11B 5/7325; G11B 5/738; G11B 2005/0021; B32B 15/04; B32B 15/18
See application file for complete search history.

(56) References Cited

U.S. PATENT DOCUMENTS

| 2008/0092945 A1* | 4/2008 | Munteanu | B82Y 30/00 136/252 |
| 2012/0307398 A1* | 12/2012 | Kanbe | G11B 5/65 360/75 |
| 2013/0314815 A1* | 11/2013 | Yuan | G11B 5/65 360/59 |
| 2014/0308542 A1* | 10/2014 | Zhang | G11B 5/7325 428/831.2 |
| 2016/0267934 A1 | 9/2016 | Furutal et al. | |
| 2018/0122416 A1* | 5/2018 | Uchida | G11B 5/65 |

* cited by examiner

*Primary Examiner* — Holly C Rickman

(57) ABSTRACT

Provided herein is an apparatus including a layer stack. A first granular metal layer overlies the layer stack, wherein the first granular metal layer includes first metal grains separated by voids. A first granular non-metal layer overlies the first granular metal layer, wherein the first granular non-metal layer includes first non-metal grains separated by a first segregant. A second granular non-metal layer overlies the first granular non-metal layer, wherein the second granular non-metal layer includes second non-metal grains separated by a second segregant. A second granular metal layer overlies the second granular non-metal layer, wherein the second granular metal layer includes second metal grains separated by a third segregant.

20 Claims, 3 Drawing Sheets

GRANULARITY IN OVERLYING MAGNETIC AND NON-MAGNETIC LAYERS

BACKGROUND

Certain devices use disk drives with magnetic recording media to store information. For example, disk drives can be found in many desktop computers, laptop computers, and data centers. Magnetic recording media store information magnetically as bits. Bits store information by holding and maintaining a magnetization that is adjusted by a disk drive head. In order to store more information on a disk, bits are made smaller and packed closer together, thereby increasing the density of the bits. Therefore as the bit density increases, disk drives can store more information.

SUMMARY

Provided herein is an apparatus including a layer stack. A first granular metal layer overlies the layer stack, wherein the first granular metal layer includes first metal grains separated by voids. A first granular non-metal layer overlies the first granular metal layer, wherein the first granular non-metal layer includes first non-metal grains separated by a first segregant. A second granular non-metal layer overlies the first granular non-metal layer, wherein the second granular non-metal layer includes second non-metal grains separated by a second segregant. A second granular metal layer overlies the second granular non-metal layer, wherein the second granular metal layer includes second metal grains separated by a third segregant. These and other features and advantages will be apparent from a reading of the following detailed description.

DESCRIPTION

Figure 1:
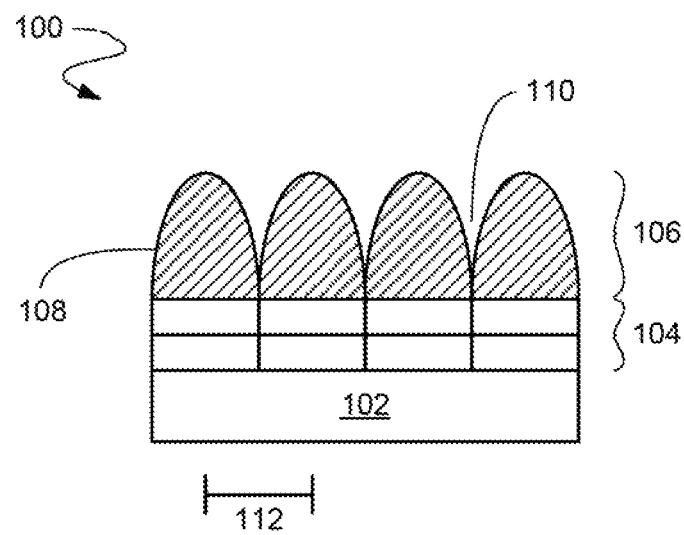
FIG. 1 shows a granular heat assisted magnetic recording media according to one aspect of the present embodiments.

Before various embodiments are described in greater detail, it should be understood that the embodiments are not limiting, as elements in such embodiments may vary. It should likewise be understood that a particular embodiment described and/or illustrated herein has elements which may be readily separated from the particular embodiment and optionally combined with any of several other embodiments or substituted for elements in any of several other embodiments described herein.

It should also be understood that the terminology used herein is for the purpose of describing the certain concepts, and the terminology is not intended to be limiting. Unless defined otherwise, all technical and scientific terms used herein have the same meaning as commonly understood in the art to which the embodiments pertain.

Unless indicated otherwise, ordinal numbers (e.g., first, second, third, etc.) are used to distinguish or identify different elements or steps in a group of elements or steps, and do not supply a serial or numerical limitation on the elements or steps of the embodiments thereof. For example, "first," "second," and "third" elements or steps need not necessarily appear in that order, and the embodiments thereof need not necessarily be limited to three elements or steps. It should also be understood that, unless indicated otherwise, any labels such as "left," "right," "front," "back," "top," "middle," "bottom," "beside," "forward," "reverse," "overlying," "underlying," "up," "down," or other similar terms such as "upper," "lower," "above," "below," "under," "between," "over," "vertical," "horizontal," "proximal," "distal," and the like are used for convenience and are not intended to imply, for example, any particular fixed location, orientation, or direction. Instead, such labels are used to reflect, for example, relative location, orientation, or directions. It should also be understood that the singular forms of "a," "an," and "the" include plural references unless the context clearly dictates otherwise.

Terms such as "over," "overlying," "above," "under," etc. are understood to refer to elements that may be in direct contact or may have other elements in-between. For example, two layers may be in overlying contact, wherein one layer is over another layer and the two layers physically contact. In another example, two layers may be separated by one or more layers, wherein a first layer is over a second layer and one or more intermediate layers are between the first and second layers, such that the first and second layers do not physically contact.

As the technology of magnetic recording media reaches maturity, it becomes increasingly difficult to continue to increase the storage capacity of recording media (e.g. disk drive disks) or to reduce the size of recording media while maintaining storage capacity. Such challenges may be overcome by increasing the bit density on the recording media. However, increasing the bit density can decrease the signal to noise ratio ("SNR") below acceptable levels. SNR can be increased by using ultra-thin magnetic films to bring the magnetic read/write head closer to the recording media. However, ultra-thin magnetic films lower the thermal stability of the grains within the bits, thereby increasing the grains' susceptibility to fluctuation and information loss. Embodiments described below address these concerns with heat assisted magnetic recording ("HAMR").

With a HAMR drive, media with a magnetically strong recording layer is heated during a magnetic writing process. The heat temporarily lowers the magnetic strength of the recording layer, allowing a write head to magnetically record information. After the information is written, the media cools and the magnetic strength returns. In the cooled, magnetically strong state, the HAMR media is highly resistant to magnetic and thermal fluctuation, thereby locking in the recorded information.

HAMR media includes granular layers with grains that are segregated in order to physically and magnetically decouple the grains from one another. Segregation of the grains may be done, for example, with formation of carbon or oxides at the boundaries between adjacent magnetic grains. As such, the segregated magnetic grains form a granular layer. When multiple granular layers are stacked together they form a columnar structure.

In order to increase storage capacity, increase the smoothness of the media, as well as control the spread of heat through the recording media as a result of the HAMR writing process, it is advantageous to maintain granularity through media layers while keeping the grains close together. Embodiments described below allow the grains to be more closely packed together by decoupling grain boundary thickness from grain size. In other words, thicker grain boundaries are no longer used to make smaller grains. Instead, grain size is controlled by underlying grains in underlying layers, and grain boundaries are controlled by the amount of segregants in the layer with the grains. As a result, grains can be made smaller and packed closer together. In addition, in various embodiments the height of the grains may be controlled (e.g. increased or decreased) without affecting the density of the grains.

Referring now to FIG. 1, a granular HAMR media 100 is shown according to one aspect of the present embodiments. A substrate 102 is provided. In various embodiments, the substrate 102 is disc shaped may include a non-magnetic metal, alloy, or non-metal. For example, the substrate 102 may comprise aluminum, an aluminum alloy, glass, ceramic, glass-ceramic, polymeric material, a laminate composite, or any other suitable non-magnetic material.

Overlying the substrate 102 is a layer stack 104. The layer stack 104 may include any number of layers such as (but not limited to): soft magnetic underlayer, heat sink layer, seed layer, metallic layer, non-metallic layer, amorphous layer, poly-crystalline layer, continuous layer, granular layer, etc. In various embodiments, the layer stack 104 may also include a layer deposited in a low pressure environment in order to provide a desired lattice for the growth of a subsequent layer. For example, such a layer may include Ru, RuCr, RuCrMn, RuCo, RuCoCr, etc. that was deposited with a pressure of 5 mTorr.

Overlying the layer stack 104 is a first granular layer 106. The first granular layer 106 includes first metal grains 108 that are separated by voids 110. The first metal grains 108 may include ruthenium in a hexagonal close-packed (hcp) structure. As a result of the first metal grains 108, the first granular layer 106 may also be referred to as a first granular metal layer in various embodiments. It is understood that the voids 110 are an absence of solid material and may include, for example, a vacuum or gas. The first metal grains take a (0002) preferred orientation, i.e. the hcp metal grains in the first metal layer have their (0002) axes in the film normal. Such a thin film growth with an (0002) preferred orientation is also referred as (0002) crystalline texture, or simply (0002) texture.

In various embodiments, the first granular layer 106 is deposited in a high pressure environment in order to provide a granular top surface for the growth of a subsequent layer. For example, the first granular layer 106 may include ruthenium that was deposited with a pressure of 100 mTorr. It is understood that the low 5 mTorr and high 100 mTorr are merely exemplary and not intended to limit the scope of the embodiments. In some embodiments, various elements (including ruthenium) may use different pressures or ranges of pressures to fix the hcp and granularity. The first metal grains 108 include a center to center distance 112 that is measured from the center of one grain to the center of an adjacent grain.

Figure 2:
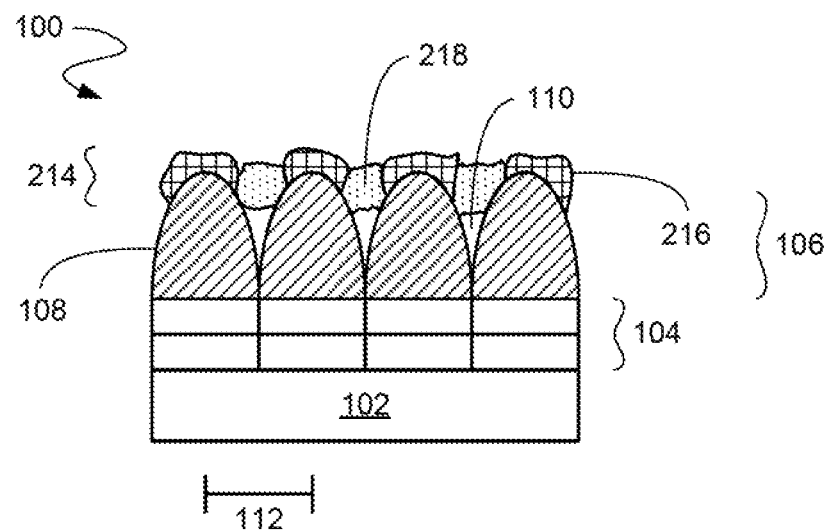
FIG. 2 shows the granular heat assisted magnetic recording media including a second granular layer according to one aspect of the present embodiments.

Referring now to FIG. 2, the granular HAMR media 100 including a second granular layer 214 is shown according to one aspect of the present embodiments. The second granular layer 214 overlies the first granular layer 106. The second granular layer 214 includes first non-metal grains 216 that are separated by a first segregant 218. As a result of the first non-metal grains 216, the second granular layer 214 may also be referred to as a first granular non-metal layer in various embodiments. The second granular layer 214 may be 0.5 nm to 10 nm thick. It is understood that the range is inclusive of 0.5 nm and 10 nm and that subsets of the range (e.g. 1 nm-9 nm, 3.5 nm-7.8 nm, etc.) may also be used in various embodiments.

The first non-metal grains 216 may include zinc oxide (ZnO) in a hexagonal structure. Therefore, the first non-metal grains 216 (e.g. ZnO grains) have the (0002) crystalline texture as the first metal grains 108 (e.g. first hcp grains). The first non-metal grains 216 form over the first metal grains 108 and maintain the same center to center distance 112.

The first segregant 218 forms between the first non-metal grains 216 and over the voids 110. The first segregant 218 forms boundaries that physically separate the first non-metal grains 216 from each other. The first segregant 218 may comprise 5% to 50% of the second granular layer 214. It is understood that the range is inclusive of 5% and 50% and that subsets of the range (e.g. 6%-39%, 7.5%-28.8%, etc.) may also be used in various embodiments.

The first segregant 218 may include, for example, C, BC, BN, $SiO_2$, $TiO_2$, $B_2O_3$, etc. or combinations of segregants. Although the first non-metal grains 216 maintain the same center to center distance 112 as the first metal grains 108, the thickness of the first non-metal grains 216 may be controlled by the volume and thickness of the first segregant 218.

Figure 3:
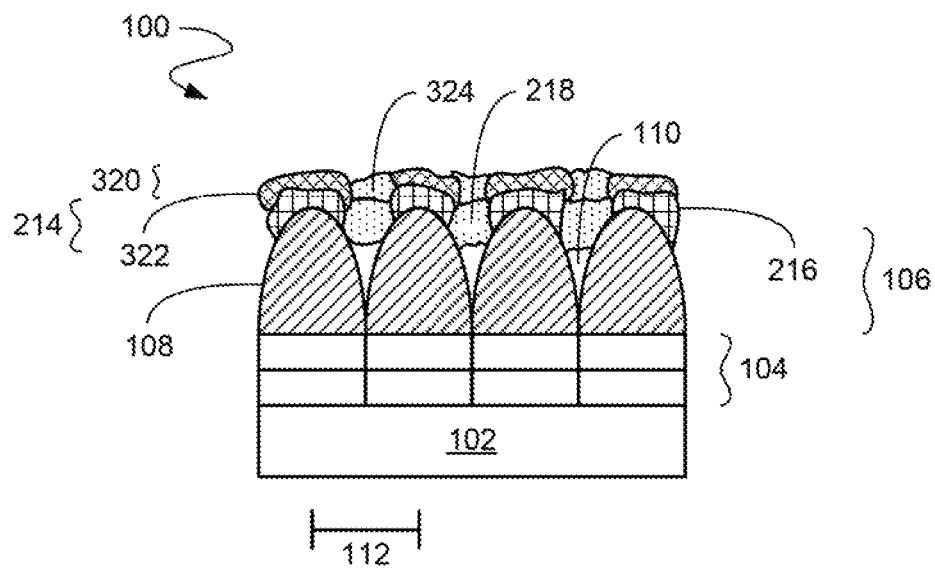
FIG. 3 shows the granular heat assisted magnetic recording media including a third granular layer according to one aspect of the present embodiments.

Referring now to FIG. 3, the granular HAMR media 100 including a third granular layer 320 is shown according to one aspect of the present embodiments. The third granular layer 320 overlies the second granular layer 214. The third granular layer 320 includes second non-metal grains 322 that are separated by a second segregant 324. As a result of the second non-metal grains 322, the third granular layer 320 may also be referred to as a second granular non-metal layer in various embodiments. The third granular layer 320 may be 0.5 nm to 10 nm thick. It is understood that the range is inclusive of 0.5 nm and 10 nm and that subsets of the range (e.g. 1 nm-9 nm, 3.5 nm-7.8 nm, etc.) may also be used in various embodiments.

The second non-metal grains 322 may include magnesium oxide (MgO) in a face-centered cubic (fcc) structure. In varies embodiments, the second non-metal grains 322 may also include a mixture of oxides or nitrites of NaCl structure, such as MgO, TiO, CoO, FeO, NiO, TiN, WN, CrN, etc. Therefore, the second non-metal grains 322 (e.g. MgO grains) have a different crystal structure than the underlying first non-metal grains 216 (e.g. ZnO grains). The second non-metal grains 322 form over the first non-metal grains 216 and maintain the same center to center distance 112. The second non-metal grains 322 take (200) crystalline texture on top of the first non-metal grains 216.

The second segregant 324 forms between the second non-metal grains 322 and over the first segregant 218. The second segregant 324 forms boundaries that physically separate the second non-metal grains 322 from each other. The second segregant 324 may comprise 5% to 50% of the third granular layer 320. It is understood that the range is inclusive of 5% and 50% and that subsets of the range (e.g. 6%-39%, 7.5%-28.8%, etc.) may also be used in various embodiments.

The second segregant 324 may include, for example, C, BC, BN, $SiO_2$, $TiO_2$, $B_2O_3$, etc. or combinations of segregants. In addition, the second segregant 324 may include the same material or a different material than the first segregant 218. Although the second non-metal grains 322 maintain the same center to center distance 112 as the first non-metal grains 216, the thickness of the second non-metal grains 322 may be controlled by the volume and thickness of the second segregant 324. Furthermore, the second segregant 324 may have the same or different volume and/or thickness than the first segregant 218.

Figure 4:
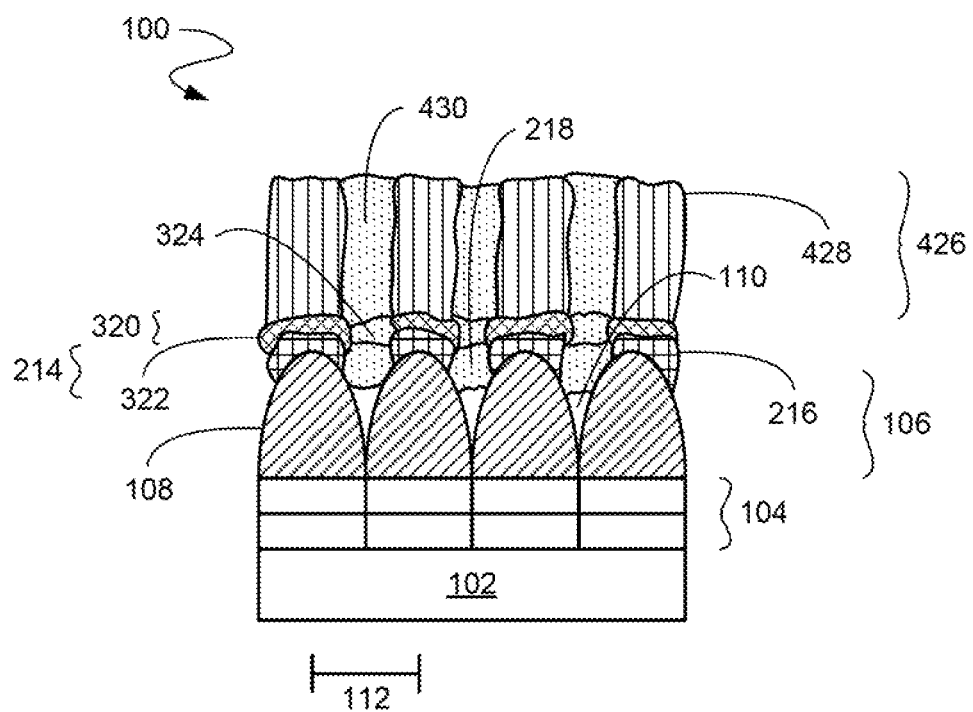
FIG. 4 shows the granular heat assisted magnetic recording media including a fourth granular layer according to one aspect of the present embodiments.

Referring now to FIG. 4, the granular HAMR media 100 including a fourth granular layer 426 is shown according to one aspect of the present embodiments. The fourth granular layer 426 overlies the third granular layer 320. The fourth granular layer 426 includes second metal grains 428 that are separated by a third segregant 430. As a result of the second metal grains 428, the fourth granular layer 426 may also be referred to as a second granular metal layer in various embodiments.

The second metal grains 428 may include iron-platinum (FePt) in an L10 structure. The second metal grains 428 (e.g. First L10 grains) have a (002) crystal texture grown on top of the underlying second non-metal grains 322 (e.g. MgO grains). The second metal grains 428 form over the second non-metal grains 322 and maintain the same center to center distance 112. The second metal grains 428 may include an alloy of Fe, Pt, Cu, Pt, Ni, Ru, and other metals together to form a L10 structure. Atomic % of each above mentioned elements could be between 0-80% to form a L10 structure. The second metal grains 428 could be magnetic or non-magnetic. The second metal grains 428 could be constituted by multiple layers of L10 structure with abovementioned compositions.

The third segregant 430 forms between the second metal grains 428 and over the second segregant 324. The third segregant 430 forms boundaries that physically separate the second metal grains 428 from each other. The third segregant 430 may include, for example, C, BC, BN, SiO$_2$, TiO$_2$, B$_2$O$_3$, etc. or combinations of segregants. In addition, the third segregant 430 may include the same material or a different material than the first segregant 218 and/or the second segregant 324. As such, any combination of the first segregant 218, the second segregant 324, and the third segregant 430 may include the same or different segregant materials.

Although the second metal grains 428 maintain the same center to center distance 112 as the second non-metal grains 322, the grain boundary thickness of the second metal grains 428 may be controlled by the volume % of the third segregant 430. Furthermore, the third segregant 430 may have the same or different volume % as the second segregant 324. As such, any combination of the first segregant 218, the second segregant 324, and the third segregant 430 may include the same or different volume % and may form different grain boundary thicknesses. In addition, the first metal grains 108 (e.g. first hcp grains), the first non-metal grains 216 (e.g. ZnO grains), the second non-metal grains 322 (e.g. MgO grains), and the second metal grains 428 (e.g. first L10 grains) all include and maintain the same center to center distance 112.

Figure 5:
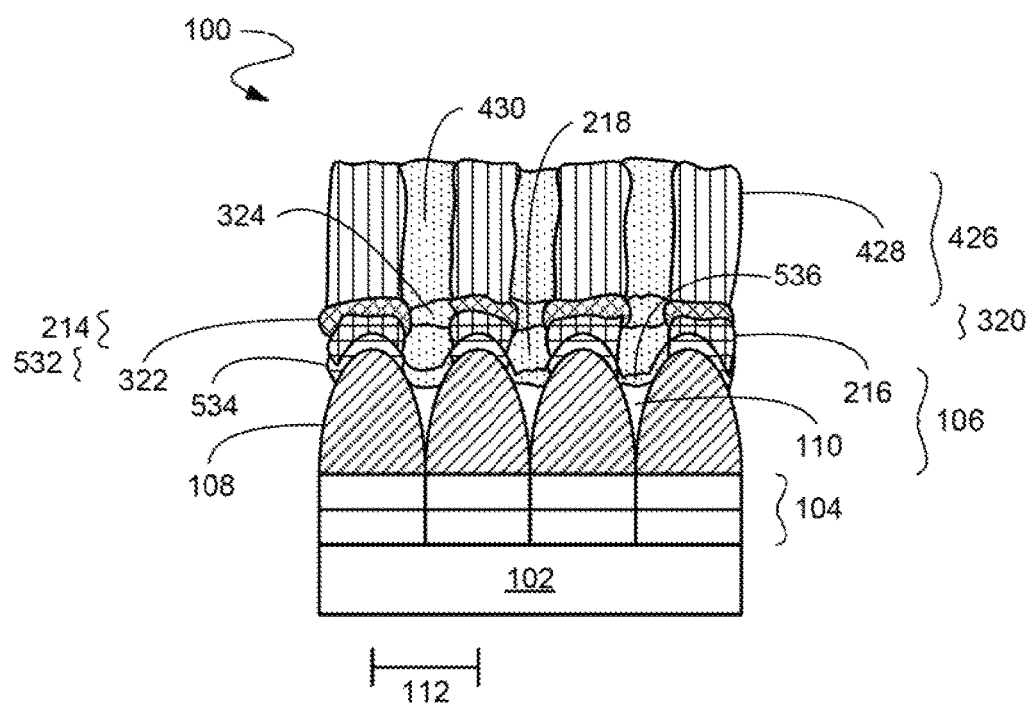
FIG. 5 shows the granular heat assisted magnetic recording media including an additional granular layer according to one aspect of the present embodiments.

Referring now to FIG. 5, the granular HAMR media 100 including an additional granular layer 532 is shown according to one aspect of the present embodiments. The additional granular layer 532 overlies the first granular layer 106 and under the second granular layer 214. The additional granular layer 532 includes additional metal grains 534 that are separated by an additional segregant 536. As a result of the additional metal grains 534, the additional granular layer 532 may also be referred to as an additional granular metal layer in various embodiments. The additional granular layer 532 may be 0.5 nm to 10 nm thick. It is understood that the range is inclusive of 0.5 nm and 10 nm and that subsets of the range (e.g. 1 nm-9 nm, 3.5 nm-7.8 nm, etc.) may also be used in various embodiments.

The additional metal grains 534 may include fcc platinum Pt or hcp Ru or a mixture of alloys such as Ru, Cr, Co, Ni, Pt, etc. that takes either fcc or hcp structure. Therefore, the additional metal grains 534 (e.g. additional metal grains) have either (0002) crystalline texture for the hcp crystal structure or the (111) crystalline orientation for the fcc structure grown on top of the underlying first metal grains 108 (e.g. first hcp grains) and below the overlying first non-metal grains 216 (e.g. ZnO grains). The additional metal grains 534 form between the first metal grains 108 and the first non-metal grains 216, while maintaining the same center to center distance 112.

The additional segregant 536 forms between the additional metal grains 534, over the voids 110, and under the first segregant 218. The additional segregant 536 forms boundaries that physically separate the additional metal grains 534 from each other. The additional segregant 536 may include, for example, C, BC, BN, SiO$_2$, TiO$_2$, B$_2$O$_3$, etc. or combinations of segregants. In addition, the additional segregant 536 may include the same material or a different material than the first segregant 218, the second segregant 324, and/or the third segregant 430. As such, any combination of the additional segregant 536, the first segregant 218, the second segregant 324, and the third segregant 430 may include the same or different segregant materials.

Although the additional metal grains 534 maintain the same center to center distance 112 as the first metal grains 108, the grain boundary thickness of the additional metal grains 534 may be controlled by the volume % of the additional segregant 536. Furthermore, the additional segregant 536 may have the same or different volume % than the first segregant 218. As such, any combination of the additional segregant 536, the first segregant 218, the second segregant 324, and the third segregant 430 may include the same or different volume %. In addition, the first metal grains 108 (e.g. first hcp grains), the additional metal grains 534 (e.g. additional metal grains), the first non-metal grains 216 (e.g. ZnO grains), the second non-metal grains 322 (e.g. MgO grains), and the second metal grains 428 (e.g. first L10 grains) all include and maintain the same center to center distance 112.

For clarity of illustration, only a few of the layers, grains, and segregant are shown. However, it is understood that various embodiments may include any number of layers, grains, and segregant. For example, multiple L10 FePt layers with segregants may constitute the fourth granular layer 426 in FIGS. 4 and 5. Various embodiments may include overcoat and lubricant layers, as well as one or more other layers above, below, and between the layers depicted in the Figures. It is also understood that the shape and size of layers, grains, and segregant depicted in Figures are for illustration purposes. The actual shapes and sizes may vary from each other.

While the embodiments have been described and/or illustrated by means of particular examples, and while these embodiments and/or examples have been described in considerable detail, it is not the intention of the Applicants to restrict or in any way limit the scope of the embodiments to such detail. Additional adaptations and/or modifications of the embodiments may readily appear, and, in its broader aspects, the embodiments may encompass these adaptations and/or modifications. Accordingly, departures may be made from the foregoing embodiments and/or examples without departing from the scope of the concepts described herein.

The implementations described above and other implementations are within the scope of the following claims.

What is claimed is:

1. An apparatus comprising:
    a layer stack;
    a first granular metal layer overlying the layer stack, wherein the first granular metal layer includes first metal grains separated by voids;
    a first granular non-metal layer overlying the first granular metal layer, wherein the first granular non-metal layer includes first non-metal grains separated by a first segregant;
    a second granular non-metal layer overlying the first granular non-metal layer, wherein the second granular non-metal layer includes second non-metal grains separated by a second segregant; and
    a second granular metal layer overlying the second granular non-metal layer, wherein the second granular metal layer includes second metal grains separated by a third segregant.

2. The apparatus of claim 1, wherein a center to center distance of the first metal grains is the same as the second metal grains.

3. The apparatus of claim 1, wherein the first non-metal grains include a different crystal structure than the second non-metal grains.

4. The apparatus of claim 1, wherein the first non-metal grains include a hexagonal structure, and the second non-metal grains include a NaCl-structure.

5. The apparatus of claim 1, wherein the first metal grains include a hexagonal close-packed structure, and the second metal grains include a L10 structure.

6. The apparatus of claim 1, wherein the first non-metal grains include zinc oxide (ZnO), and the second non-metal grains include magnesium oxide (MgO) or a mixture of oxides or nitrites with NaCl-structure.

7. The apparatus of claim 1, wherein the first segregant, the second segregant, and the third segregant include carbon.

8. An apparatus comprising:
    a first granular layer overlying a granular layer stack, wherein the first granular layer includes hexagonal close-packed grains separated by voids;
    a second granular layer overlying the first granular layer, wherein the second granular layer includes hexagonal non-metal grains separated by a first segregant;
    a third granular layer overlying the second granular layer, wherein the third granular layer includes NaCl-structured grains separated by a second segregant; and
    a fourth granular layer overlying the third granular layer, wherein the fourth granular layer includes L10 grains separated by a third segregant.

9. The apparatus of claim 8, wherein the hexagonal close-packed grains, the hexagonal non-metal grains, the NaCl-structured grains, and the L10 grains include a same center to center distance.

10. The apparatus of claim 8, wherein the hexagonal close-packed grains include ruthenium.

11. The apparatus of claim 8, wherein the third segregant is over the second segregant, the second segregant is over the first segregant, and the first segregant is over the voids.

12. The apparatus of claim 8, wherein the second granular layer includes zinc oxide (ZnO), and the third granular layer includes magnesium oxide (MgO).

13. The apparatus of claim 8, wherein the first segregant and the second segregant include different volumes.

14. The apparatus of claim 8, wherein the first segregant and the second segregant include different segregant materials.

15. An apparatus comprising:
    first metal grains separated by voids, wherein the first metal grains include a center to center distance;
    first non-metal grains separated by a first segregant, wherein the first non-metal grains are over the first metal grains and the first segregant is over the voids;
    a second non-metal grains separated by a second segregant, wherein the second non-metal grains are over the first non-metal grains and the second segregant is over the first segregant; and
    second metal grains separated by a third segregant, wherein
        the second metal grains are over the second non-metal grains,
        the third segregant is over the second segregant, and
        the second metal grains include the center to center distance.

16. The apparatus of claim 15, further comprising additional metal grains separated by additional segregant, wherein the additional metal grains are between the first metal grains and the first non-metal grains, and the additional segregant is between the voids and the first segregant.

17. The apparatus of claim 15, wherein the second metal grains include iron-platinum (FePt).

18. The apparatus of claim 15, wherein the first non-metal grains include zinc oxide (ZnO), and the second non-metal grains include magnesium oxide (MgO).

19. The apparatus of claim 15, wherein two of the first segregant, the second segregant, and the third segregant include different grain boundary thicknesses.

20. The apparatus of claim 15, wherein two of the first segregant, the second segregant, and the third segregant include different segregant materials.

* * * * *